(12) United States Patent
Tecu (10) Patent No.: US 9,552,182 B2
(45) Date of Patent: Jan. 24, 2017

(54) PRINTING USING MULTIPLE PRINT PROCESSING RESOURCES

(71) Applicant: Konica Minolta Laboratory U.S.A., Inc., San Mateo, CA (US)

(72) Inventor: Kirk Steven Tecu, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 14/564,670

(22) Filed: Dec. 9, 2014

(65) Prior Publication Data

US 2016/0162221 A1 Jun. 9, 2016

(51) Int. Cl.
*G06F 3/12* (2006.01)

(52) U.S. Cl.
CPC ............... *G06F 3/124* (2013.01); *G06F 3/126* (2013.01); *G06F 3/1215* (2013.01); *G06F 3/1285* (2013.01)

(58) Field of Classification Search
CPC .... G06F 3/124; G06F 15/1836; G06F 3/1215; G06F 3/1275; G06F 3/1242
USPC ............................... 358/1.9, 1.13, 1.15, 1.16
See application file for complete search history.

(56) References Cited

U.S. PATENT DOCUMENTS

| | | | | |
|---|---|---|---|---|
| 5,774,638 | A * | 6/1998 | Kageyama | G06F 3/1296 345/505 |
| 8,823,997 | B2 * | 9/2014 | Hayakawa | G06K 15/1822 358/1.15 |
| 2003/0128384 | A1 | 7/2003 | Nelson et al. | |
| 2004/0196497 | A1 * | 10/2004 | Klassen | G06F 3/1285 358/1.15 |
| 2005/0094194 | A1 * | 5/2005 | Dolev | G06F 3/122 358/1.15 |
| 2007/0242303 | A1 * | 10/2007 | Barry | G06F 3/1212 358/1.15 |
| 2008/0007754 | A1 * | 1/2008 | Torii | G06K 15/02 358/1.12 |
| 2008/0165378 | A1 * | 7/2008 | Barry | B41J 29/393 358/1.9 |
| 2009/0128841 | A1 * | 5/2009 | Cyman, Jr. | G06K 15/1857 358/1.13 |
| 2011/0194137 | A1 * | 8/2011 | Klassen | G06F 3/1211 358/1.15 |
| 2011/0235072 | A1 * | 9/2011 | Yamaguchi | H04N 1/46 358/1.9 |
| 2012/0133984 | A1 * | 5/2012 | Hayakawa | G06F 3/1211 358/1.16 |
| 2012/0188590 | A1 * | 7/2012 | Klassen | G06F 3/1211 358/1.15 |
| 2012/0307276 | A1 * | 12/2012 | Takenaka | G06K 15/1823 358/1.13 |
| 2013/0010325 | A1 * | 1/2013 | Varga | G06K 15/1857 358/1.15 |

(Continued)

*Primary Examiner* — Jerome Grant, II
(74) *Attorney, Agent, or Firm* — Osha Liang LLP (57) ABSTRACT

A method of managing an electronic document (ED). The method includes: receiving, by a print manager, the ED and an output location; sending, by the print manager, a first portion of the ED to a plurality of print processing resources (PPRs); receiving, by the print manager, a first raster image file associated with the first portion from a first winning PPR of the plurality of PPRs; sending, by the print manager, an interrupt message to a losing PPR of the plurality of PPRs; and sending, by the print manager, the first raster image file to the output location.

14 Claims, 6 Drawing Sheets

(56) References Cited

U.S. PATENT DOCUMENTS

2013/0081146 A1* 3/2013 Hakozaki ........... H04N 1/00222
  726/28
2013/0258376 A1* 10/2013 Tsuchiya ............... G06F 9/3877
  358/1.13

* cited by examiner

PRINTING USING MULTIPLE PRINT PROCESSING RESOURCES

BACKGROUND

In order to print an electronic document (ED), it is often necessary to generate one or more raster images for the ED. Generation of these raster images is time consuming, computationally expensive, and can overburden the printer selected by the user to print the ED. Other print processing resources that are available to the user may remain idle (i.e., play no part) while the printer selected by the user is generating the raster images and the hardcopy of the ED.

An ED may have various types of content (e.g., text, clipart, images, etc.). Moreover, different portions of the ED may have different types of content. Some print processing resources are specialized to process one type of content and are able to do so more quickly than a generic print processing resource. Although users are interested in printing quickly, users are also interested in selecting the printer that will generate the hardcopy (e.g., the printer located closest to the user), and do not consider the capabilities of other print processing resources.

SUMMARY

In general, in one aspect, the invention relates to a method of managing an electronic document (ED). The method comprises: receiving, by a print manager, the ED and an output location; sending, by the print manager, a first portion of the ED to a plurality of print processing resources (PPRs); receiving, by the print manager, a first raster image file associated with the first portion from a first winning PPR of the plurality of PPRs; sending, by the print manager, an interrupt message to a losing PPR of the plurality of PPRs; and sending, by the print manager, the first raster image file to the output location.

In general, in one aspect, the invention relates to a method of managing an electronic document (ED). The method comprises: receiving, by a conversion manager, the ED in a first format and an output location; sending, by the conversion manager, a first portion of the ED in the first format to a plurality of conversion processing resources (CPRs); receiving, by the conversion manager, the first portion of the ED in a second format from a first winning CPR of the plurality of CPRs; sending, by the conversion manager, an interrupt message to a losing CPR of the plurality of CPRs, wherein the losing CPR cancels conversion of the first portion from the first format to the second format in response to the interrupt message; and sending, by the conversion manager, the first portion in the second format to the output location.

In general, in one aspect, the invention relates to a non-transitory computer readable medium (CRM) storing instructions for managing an electronic document (ED). The instructions comprise functionality for: receiving the ED and an output location; sending a first portion of the ED to a plurality of print processing resources (PPRs); receiving a first raster image file associated with the first portion from a first winning PPR of the plurality of PPRs; sending an interrupt message to a losing PPR of the plurality of PPRs; and sending the first raster image file to the output location.

In general, in one aspect, the invention relates to a system for managing an electronic document (ED). The system comprises: a plurality of print processing resources (PPRs) comprising at least one selected from a group consisting of a first printer and a cloud printing service; a print manager connected to the plurality of PPRs and configured to: send a first portion of the ED to the plurality of PPRs; receive a first raster image file associated with the first portion from a first winning PPR of the plurality of PPRs; and send an interrupt message to a losing PPR of the plurality of PPRs; a second printer connected to the print manager and configured to generate a hardcopy of the ED from the first raster image file.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for a method, a system, and a non-transitory computer readable medium for managing an electronic document (ED). Upon receiving the ED, a print manager sends a portion of the ED to multiple print processing resources (e.g., printers, cloud printing services, print servers, personal computers (PCs) with print drivers, etc.). The portion may correspond to a page, a chapter, the entire ED, etc. Each of the print processing resources starts independently rasterizing the portion of the ED. The first print processing resource to finish and/or return the raster image file(s) to the print manager is the winning print processing resource. The print manager sends an interrupt message to the remaining, losing print processing resources, which triggers them to cancel their rasterizing. This process may be repeated for each portion of the ED. The print manager may assemble the various raster image files, and send them to an output location (e.g., user selected printer, user selected storage location, etc.). Additionally or alternatively, the print manager may send a raster image file to the output location as soon as it is available (i.e., the print manager does not wait to assemble all of the raster image files). Additionally or alternatively, in embodiments where the print processing resources have the entire ED, the interrupt message may trigger the losing print processing resources to cease rasterizing the current unit of the ED and start rasterizing the next unit of the ED (e.g., the current unit and the next unit may be different pages).

Figure 1:
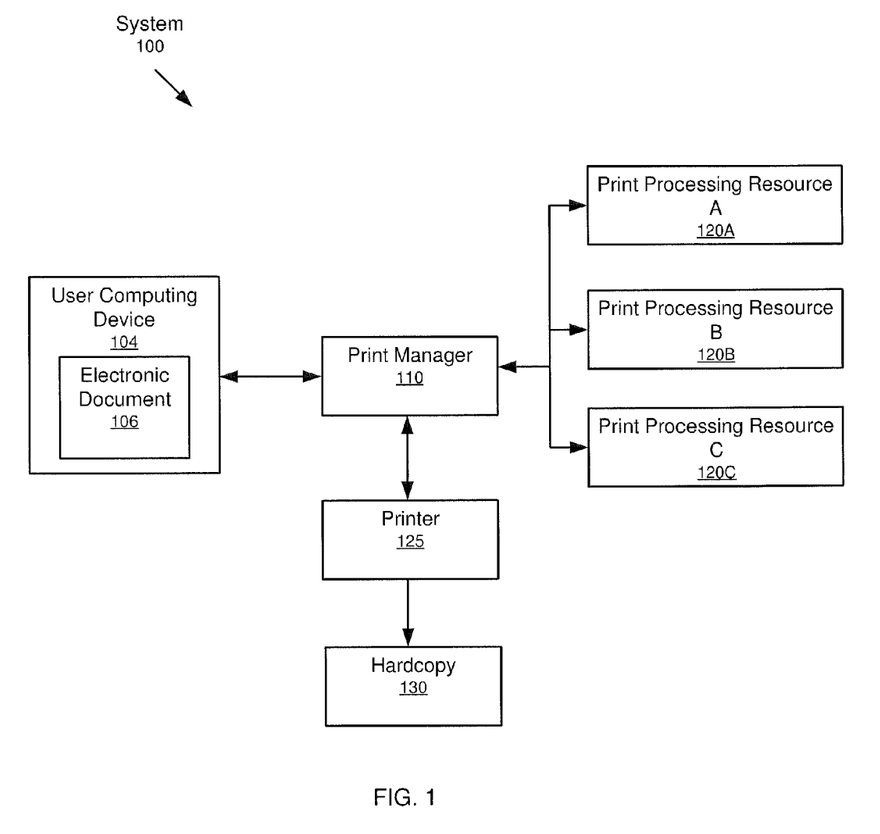
FIG. 1 shows a device in accordance with one or more embodiments of the invention.

FIG. 1 shows a system (100) in accordance with one or more embodiments of the invention. As shown in FIG. 1, the system (100) has many components, including for example, a user computing device (104), a print manager (110), and one or more print processing resources (i.e., print processing resource A (120A), print processing resource B (120B), print processing resource C (120C)). Each of these components is discussed below.

In one or more embodiments of the invention, the system (100) includes the user computing device (104). The user computing device (104) is operated by a user and may utilize one or more graphical user interfaces (GUIs) (not shown) to accept commands/settings from the user and/or display information to the user. The user computing device (104) may be a mobile computer device (e.g., smart phone, tablet computer, laptop, e-reader, etc.), a desktop personal computer (PC), a kiosk, a server, a mainframe, a cable box, etc.

In one or more embodiments of the invention, the user computing device (104) is configured to print the ED (106). In other words, the user computing device (106) may be configured to generate and issue a print job (e.g., a page description language (PDL) print job) for the ED (106). The ED (106) may be of any size (e.g., one or more pages, one or more chapters, one or more sections, etc.) and may have various types of content (e.g., text, clipart, images, etc.). The ED (106) may be in portable document format (PDF). The print job may specify an output location (e.g., printer (125), storage location, etc.) that is selected by the user.

In one or more embodiments of the invention, the ED (106) is a variable print file having one or more static elements (e.g., text, clip art, images, etc.). In such embodiments, the print job includes an auxiliary data file having multiple data items (e.g., names, addresses, etc.). Variable printing requires that multiple instances of the ED (106) be generated, which each instance having the static elements and at least one of the data items in the auxiliary data file (i.e., no two instances of the ED have the same data items).

In one or more embodiments of the invention, the system (100) has multiple print processing resources (120A-120C). Each print processing resource (120A-120C) is configured to rasterize the ED (106) or a segment of the ED (106). In other words, each print processing resource is configured to generate raster image file(s) for the ED (106). These raster image file(s) may be considered the final format required before a printer can start placing ink/toner on a page. Each print processing resource may correspond to a printer (e.g., a multifunction printer), a cloud printing service, a print server, PC with a print driver, etc.

In one or more embodiments of the invention, the print processing resources (120A-120C) are located in the same office. Additionally or alternatively, no two of the print processing resources (120A-120C) are located in the same place. For example, two print processing resources may be located in different rooms, different offices, different buildings, different cities, etc. Additional print processing resources may be added to the system (100) at any time. Similarly, print processing resources may be removed from the system (100) at any time. In one or more embodiments of the invention, printer (125) is a print processing resource. In other words, one of the print processing resources (120A-120C) may be implemented in the printer (125).

In one or more embodiments of the invention, the system (100) includes the print manager (110). The print manager (110) may be a mobile computer device (e.g., smart phone, tablet computer, laptop, e-reader, etc.), a desktop personal computer (PC), a kiosk, a server, a mainframe, a cable box, etc. The print manager (110) is connected to the user computing device and the multiple print processing resources (120A-120C). These connections may be direct (e.g., by a universal serial bus (USB) connection) or by a network(s) having wired and/or wireless segments. Although print manager (110) is shown in FIG. 1 as external to the user computing device (104) and all of the print processing resources, in other embodiments, the print manager (110) may be located on the user computing device (104) or on a print processing resource (120A-120C). The print manager (110) may also be located on the printer (125).

In one or more embodiments of the invention, the print manager (110) maintains a data structure (e.g., list, array, database, etc.) for the multiple print processing resources (120A-120C). The data structure may store/identify the multiple print processing resources (120A-120C), the software and software version executing on each of the multiple print processing resources (120A-120C), the bandwidth of each of the multiple print processing resource (120A-120C), etc. The print manager (110) may populate and maintain this data structure using any combination of discovery and monitoring protocols.

In one or more embodiments of the invention, the print manager (110) is configured to send the ED to multiple print processing resources (120A-120C). Specifically, the print manager (110) may send the entire ED to multiple print processing resources (120A-120C) that are executing the same rasterizing software and the same version of the rasterizing software. In other words, each of the print processing resources (120A-120C) receives the entire ED. The print manager (110) may designate the first print processing resource to return the raster image file(s) of the entire ED as the winning print processing resource. The print manager (110) may designate the remaining print processing resources as losing print processing resources. The likelihood of becoming the winning print processing resource may depend, in part, on the content of the ED and the specialized capabilities, if any, of the print processing resource.

In one or more embodiments of the invention, the print manager (110) is configured to send an interrupt message to the losing print processing resources. The interrupt message is effectively a request from the print manager (110) for the losing print resources to cease (e.g., cancel, terminate, etc.) the rasterizing of the ED (106) because the winning print processing resource has already provided the raster image file(s) of the ED (106). The print manager (110) may send the raster image file(s) to the output location specified in the print job for printing or storing. For example, if the output location is printer (125), the print manager (110) may send the raster image file(s) to printer (125) to generate the hardcopy (130) of the ED (106).

In one or more embodiments of the invention, the print manager (110) sends a start message with the entire ED (106) to the print processing resources (120A-120C). The start message may include a flag indicating that rasterizing the ED (106) should be done on a unit-by-unit (e.g., page-by-page, chapter-by-chapter, etc.) basis. In such embodiments, the print manager (110) receives raster image file(s) on a unit-by-unit basis, and designates the winning and losing print processing resources on a unit-by-unit basis (i.e., different units may have different winning print processing resources). The print manager (110) is configured to send an interrupt message to the losing print processing resources. Moreover, in response to the interrupt message, the losing print processing resources may both: (i) cease (e.g., cancel, terminate, etc.) rasterizing the current unit (e.g., current page) of the ED (106); and (ii) start/initiate rasterizing the next unit (e.g., next page) of the ED (106). Additionally or alternatively, the interrupt message may identify the next unit that should be rasterized by the losing print processing resources. The winning print processing resource for the unit may immediately start rasterizing the next unit without receiving the interrupt message.

As discussed above, in one or more embodiments of the invention, the ED (106) is a variable print file. In such embodiments, the print manager (110) is configured to send the ED (106) and the auxiliary data file to the multiple print processing resources (120A-120C). Rasterizing may be done on an instance-by-instance basis (discussed above). In such embodiments, the print manager (110) receives raster image file(s) for each instance of the ED, and designates the winning and losing print processing resources for each instance (i.e., different instances may have different winning print processing resources). The print manager (110) is configured to send an interrupt message to the losing print processing resources. In response to the interrupt message, the losing print processing resources may continue processing the static elements of the ED (if they have not yet finished) and start rasterizing the next instance having the next data item from the auxiliary data file. The winning print processing resource for the instance may immediately start rasterizing the next instance without receiving the interrupt message.

In one or more embodiments of the invention, the print manager (110) is configured to partition the ED into multiple portions (e.g., pages, chapters, etc.) and then send one of the portions to multiple print processing resources (120A-120C). In other words, each of the print processing resources receives the portion. The print manager (110) may designate the first print processing resource to the return the raster image file(s) of the portion as the winning print processing resource. The print manager (110) may designate the remaining print processing resources as losing print processing resources and send them an interrupt message to cease (e.g., cancel, terminate, etc.) rasterizing the portion. The print manager (110) may be configured to repeat this process for each portion. Moreover, the print manager (110) may be configured to aggregate (e.g., assemble, combine, etc.) the raster image file(s) for each portion and send them to the output location (e.g., printer (125)).

Although embodiments of the invention have focused on the printing of the ED (106), those skilled in the art having the benefit of this detailed description, will appreciate that system (100) may be used/extended to convert ED (106) from one format (file type) to a different format (file type). In such embodiments, the print manager (110) may be referred to as a conversion manager, and the print processing resources (120A-120C) may be referred to as conversion processing resources. The conversion manager may send the entire ED (106) (or a portion of the ED) in a first format to multiple conversion processing resources. Each conversion processing resource executes a conversion of the received ED (or received portion of the ED) from the first format to a second format. The first conversion processing resource to complete the conversion and send back the ED (or portion of the ED) in the second format is designated as the winning conversion processing resource. An interrupt message may be sent to the remaining, losing conversion processing resources to cease (e.g., cancel, terminate, etc.) the conversion of the ED. This may be repeated for each portion. The conversion manager may aggregate the various portions in the second format and send them to an output location specified by the user.

Figure 2:
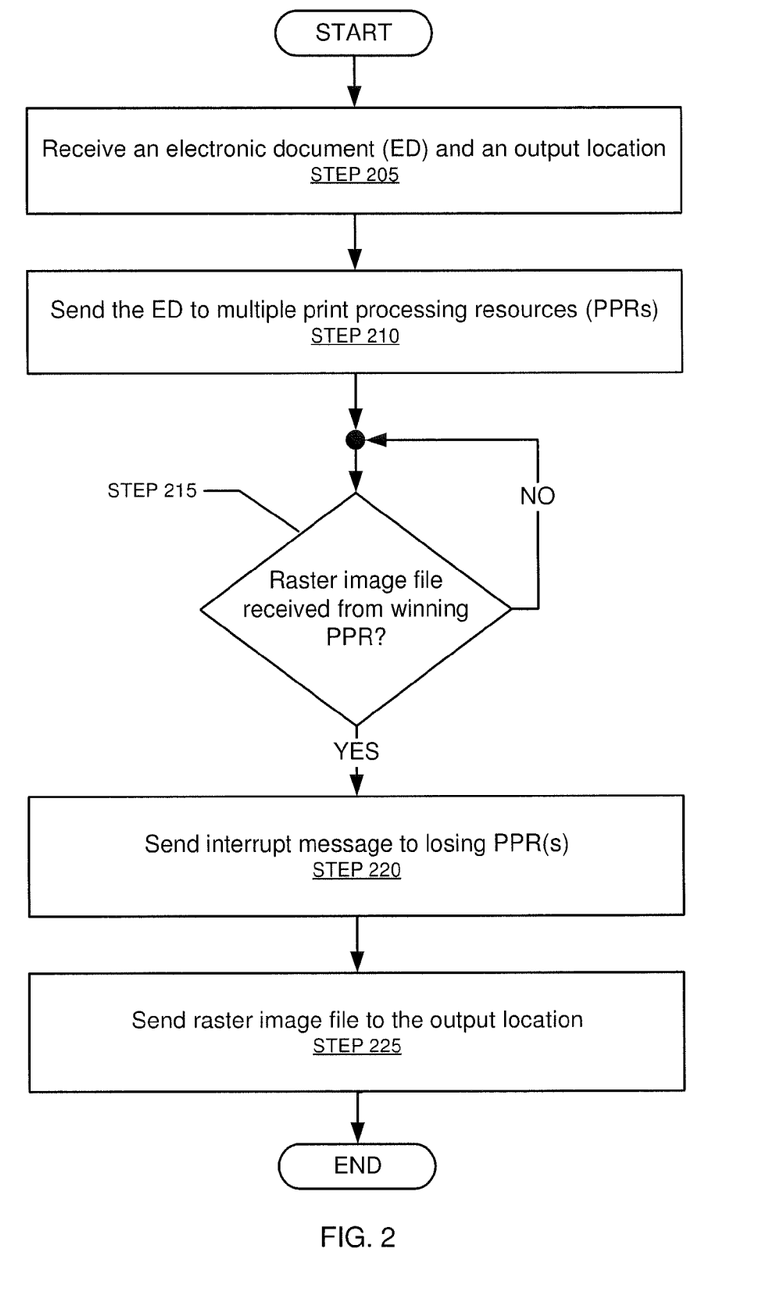
FIG. 2 shows a flowchart in accordance with one or more embodiments of the invention.

FIG. 2 shows a flowchart in accordance with one or more embodiments of the invention. The flowchart depicts a process for managing an ED. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, an ED and an output location are received (STEP 205). The ED and the output location may be specified/included in a print job received by a print manager. The print job may be a PDL print job. The ED may be of any size and have various types of content (e.g., text, clipart, images, etc.). The output location may correspond to a storage location or a printer selected by a user. For example, the selected printer may be the printer that is closest to the user. As another example, the storage location may be on the user's computing device or at a remote storage site.

In STEP 210, the ED is sent to multiple print processing resources. Each print processing resource is configured to generate a raster image file(s) of the ED. Each print processing resource may be a printer, a cloud printing service, a printer server, PC with print driver, etc. In one or more embodiments of the invention, the ED is sent by the print manager to the multiple print processing resources. The print manager may maintain a data structure (e.g., list, array, database, etc.) identifying available print processing resources. The print processing resources may be located in different offices, in different buildings, in different cities, etc.

In STEP 215, it is determined whether a raster image file(s) of the ED has been received from at least one of the print processing resources. As discussed above, the print processing resources independently start rasterizing the ED upon receiving the ED. The first print processing resource to generate and send back the raster image file is designated the winning print processing resource. In one or more embodiments of the invention, if multiple raster image files are being received in parallel from multiple print processing resources, the first print processing resource to complete the sending of its raster image file may be designated the winning print processing resource. When it is determined that a raster image file(s) for the ED has been received, the process proceeds to STEP 220. When it is determined that a raster image file(s) for the ED has not yet been received, the process waits (i.e., returns to STEP 215).

In STEP 220, an interrupt message is sent to the losing print processing resources. All print processing resources, except the winning print processing resource, are designated as losing print processing resources. The interrupt message is effectively a request for the losing print processing resources to cease (e.g., cancel, terminate, etc.) the rasterizing of the ED because the winning print processing resource has already provided the raster image file(s) of the ED.

In STEP 225, the raster image file(s) is sent to the output location. If the output location is a printer, the printer may generate a hardcopy of the ED from the raster image file. If the output location is a storage location, the raster image file(s) may be saved at the storage location for future retrieval and printing.

Those skilled in the art, having the benefit of this detailed description will appreciate that the process depicted in FIG. 2 may be repeated for any number of ED(s) having various types of content. Moreover, those skilled in the art, having the benefit of this detailed description, will appreciate that by sending the ED to multiple print processing resources, the print manager obtains the raster image file(s) of the ED as fast as possible without having to estimate, in advance, which print processing resource will be the winning print processing resource.

Figure 3:
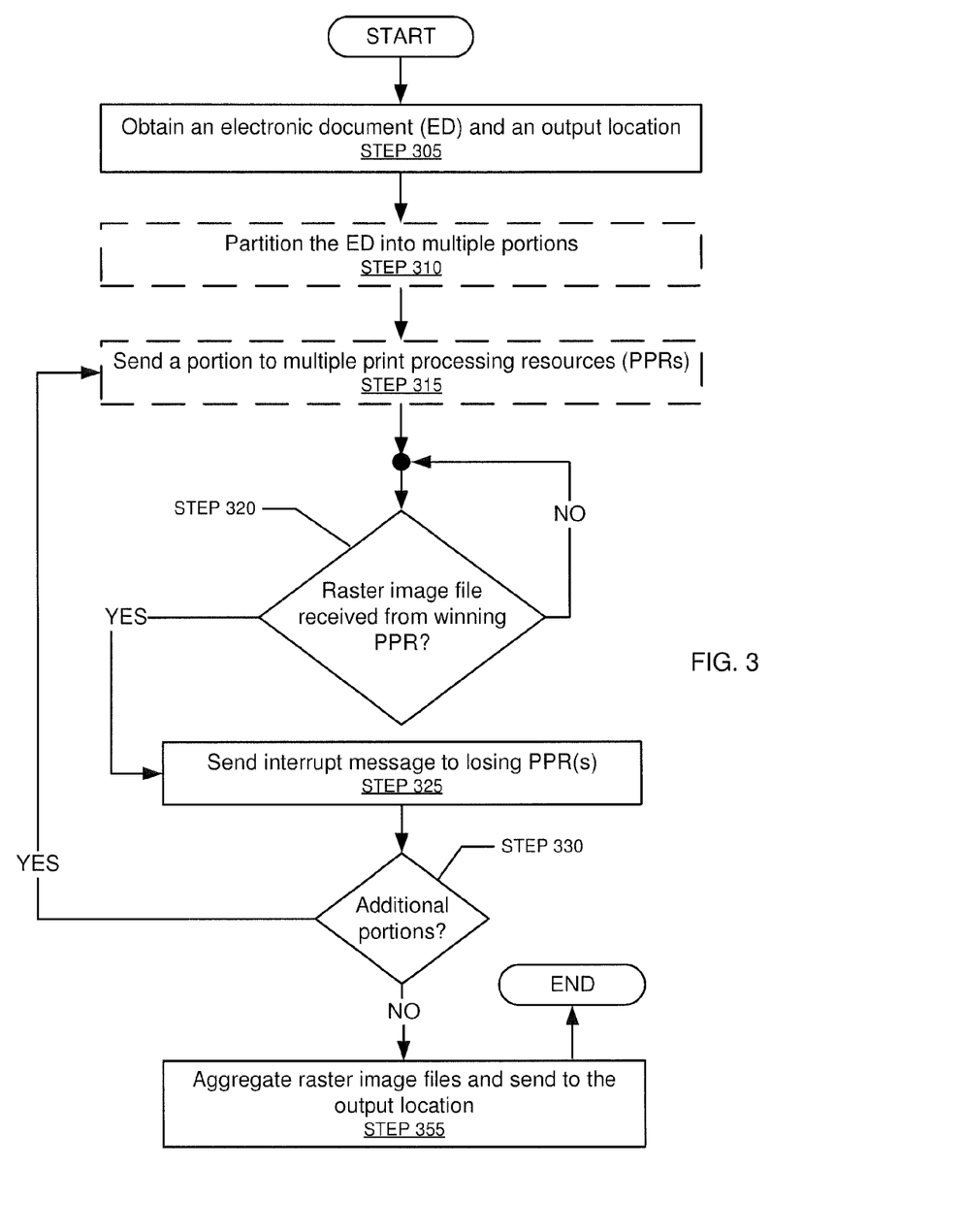
FIG. 3 shows a flowchart in accordance with one or more embodiments of the invention.

FIG. 3 shows a flowchart in accordance with one or more embodiments of the invention. The flowchart depicts a process for managing an ED. One or more of the steps in FIG. 3 may be performed by the components of the system (100), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, an ED and an output location are received (STEP 305). The ED and the output location may be specified/included in a print job received by a print manager. The print job may be a PDL print job. The ED may be of any size and have various types of content (e.g., text, clipart, images, etc.). The output location may correspond to a storage location or a printer selected by a user. For example, the selected printer may be the printer that is closest to the user. As another example, the storage location may be on the user's computing device or at a remote storage site.

In STEP 310, the ED is partitioned into multiple portions. For example, the ED may be partitioned into individuals pages, chapters, sections, etc. The partitioning may be selected in advance by the user. Alternatively, the partitioning may be done randomly by the print manager. Each portion may be the same size. Alternatively, different portions may be different sizes.

In STEP 315, one of the portions is sent to multiple print processing resources. Each print processing resource is configured to generate a raster image file(s) of the portion. Each print processing resource may be a printer, a cloud printing service, a printer server, PC with a print driver, etc. In one or more embodiments of the invention, the portion is sent by the print manager to the multiple print processing resources. The print manager may maintain a data structure (e.g., list, array, database, etc.) identifying available print processing resources.

In STEP 320, it is determined whether a raster image file(s) of the portion has been received from at least one of the print processing resources. As discussed above, the print processing resources independently start rasterizing the portion. The first print processing resource to generate and send back the raster image file is designated the winning print processing resource. When it is determined that a raster image file(s) of the portion has been received, the process proceeds to STEP 325. When it is determined that a raster image file(s) of the portion has not yet been received, the process waits (i.e., returns to STEP 315).

In STEP 325, an interrupt message is sent to the losing print processing resources. All print processing resources, except the winning print processing resource, are designated as losing print processing resources. The interrupt message is effectively a request for the losing print processing resources to cease (e.g., cancel, terminate, etc.) the rasterizing of the portion because the winning print processing resource has already provided the raster image file(s) of the portion.

In STEP 330, it is determined whether all of the portions have been sent to the print processing resources for rasterizing. When it is determined that at least one portion has not been sent for rasterizing (i.e., additional portions require rasterizing), the process returns to STEP 315. When it is determined that all of the portions have been sent for rasterizing, the process proceeds to STEP 355.

In STEP 355, the multiple raster image files for the multiple portions are aggregated (e.g., assembled, combined, etc.) and sent to the output location. If the output location is a printer, the printer may generate a hardcopy of the ED from the raster image file. If the output location is a storage location, the raster image file(s) may be saved at the storage location for future retrieval and printing.

As shown in FIG. 3, there may be multiple iterations of STEP 320 and STEP 325. During each iteration, one print processing resource will be designated the winning print processing resource, while the remaining print processing resources will be designated losing print processing resources. Those skilled in the art, having the benefit of this detailed description, will appreciate that the winning print processing resource in the current iteration may become a losing print processing resources in the next iteration. The reverse is true for a losing print processing resource in the current iteration. The likelihood of becoming the winning print processing resource may depend, in part, on the content of the portion and the specialized capabilities, if any, of the print processing resource.

Further, in order to maintain a consistent appearance among different portions of the ED, it may be necessary to use print processing resources running the same rasterizing software and/or the same version of the rasterizing software for all iterations. As discussed above, the rasterizing software executing on the multiple print processing resources may be determined by accessing the data structure maintained by the printer manager.

Although FIG. 3 shows the ED being partitioned into multiple portions (i.e., STEP 310), in other embodiments of the invention, the entire ED is sent to the multiple print processing resources (i.e., STEP 310 is omitted). Specifically, the entire ED is sent with a start message having a flag. The flag indicates that rasterizing the ED should be done on a unit-by-unit (e.g., page-by-page, chapter-by-chapter, etc.) basis. In such embodiments, raster image file(s) are received by the print manager on a unit-by-unit basis, and the winning and losing print processing resources are designed on a unit-by-unit basis (i.e., different units may have different winning print processing resources). Sending the interrupt message forces the losing print processing resources to cease (e.g., cancel, terminate, etc.) rasterizing the current unit (e.g., current page) and start/initiate rasterizing the next unit (e.g., next page). Additionally or alternatively, the interrupt message may specify the next unit that should be rasterized by the losing print processing resources. In these embodiments, STEP 330 determines whether rasterizing has taken place for all units. If additional units have not yet been rasterized, the process returns (not shown) to STEP 320 in these alternative embodiments.

Figure 4A:
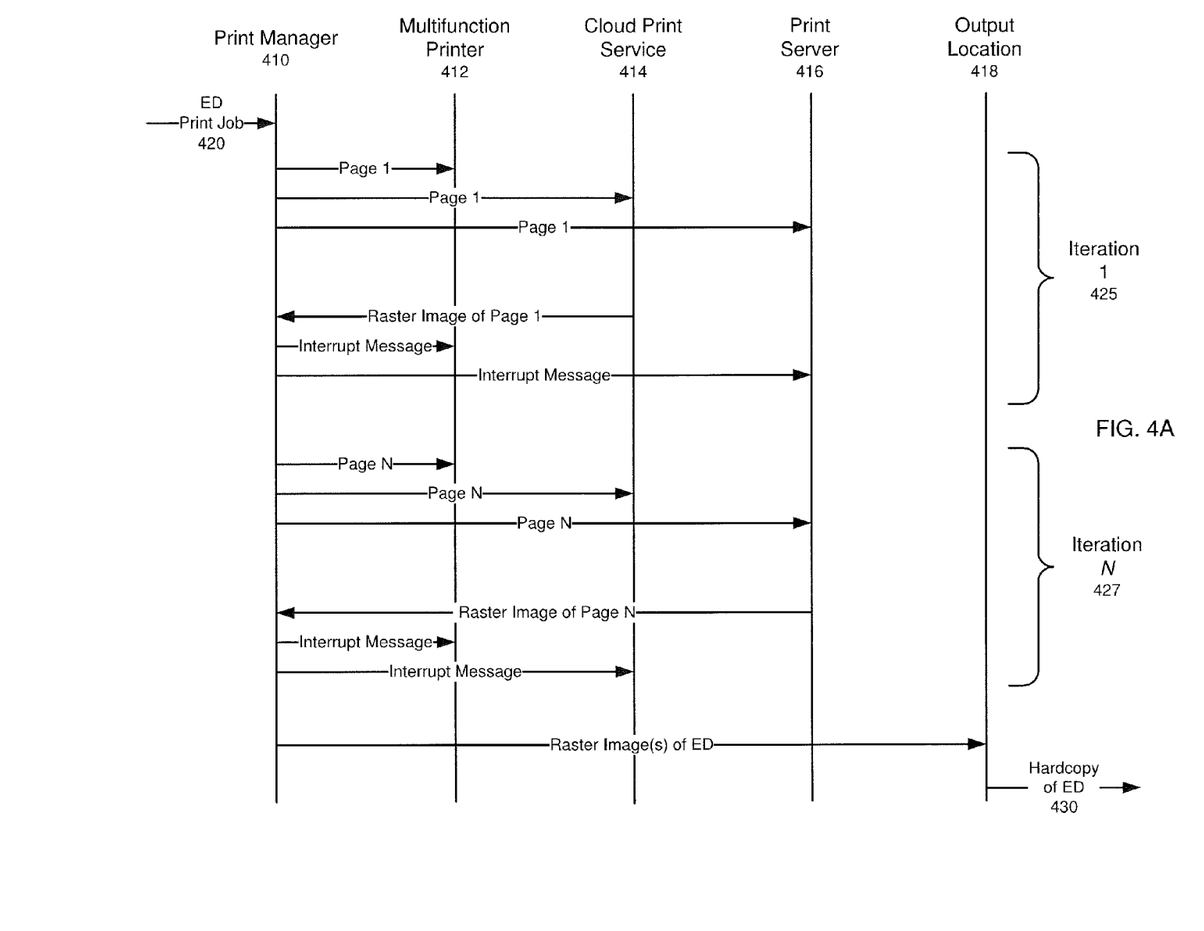
FIG. 4A and FIG. 4B show examples in accordance with one or more embodiments of the invention.

FIG. 4A shows an example in accordance with one or more embodiments of the invention. Assume there exists a print manager (410) connected to three print processing resources: multifunction printer (412), cloud print service (414), and print server (416). In FIG. 4A, the print manager (410) receives a print job (420) for an ED specifying output location (418). The print manager (410) partitions the ED into individual pages (i.e., N pages).

During iteration 1 (425), the print manager (410) sends page 1 to the multifunction printer (412), the cloud print service (414), and the print server (416). In response to receiving page 1, each of the three print processing resources (412, 414, 416) starts rasterizing page 1. The cloud print service (414) is the first print processing resource to complete the rasterizing and send the raster image of page 1 back to the print manager (410). Accordingly, the print manager (410) designates the cloud print service (414) as the winning print processing resource, and sends interrupt messages to the losing print processing resources (412, 416). In response to the interrupt message, the losing print processing resources (412, 416) each cease their respective rasterizing of page 1.

Later, during iteration N (427), the print manager (410) sends page N to the multifunction printer (412), the cloud print service (414), and the print server (416). In response to receiving page N, each of the three print processing resources (412, 414, 416) starts rasterizing page N. The print server (416) is the first print processing resource to complete the rasterizing and to send the raster image of page N back to the print manager (410). Accordingly, the print manager (410) designates the printer server (416) as the winning print processing resource, and sends interrupt messages to the losing print processing resources (412, 414). In response to the interrupt message, the losing print processing resources (412, 414) each cease their respective rasterizing of page N.

Then, the print manager (410) aggregates (i.e., assembles, combines, etc.) the multiple raster images (e.g., raster image of page 1, . . . , raster image of page N) of the ED and sends them to the output location (418). The output location (418) may be a printer selected by the user. The output location (418) generates a hardcopy (430) of the ED.

Figure 4B:
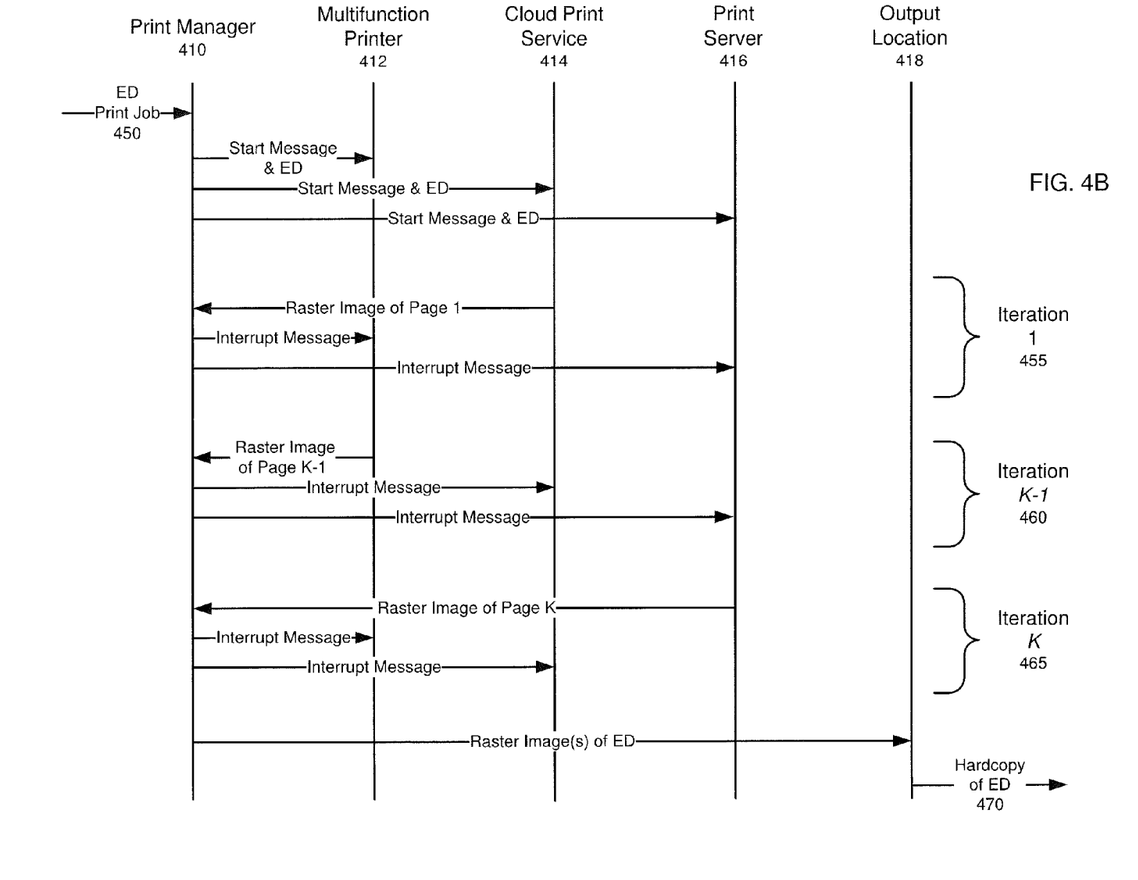

FIG. 4B shows an example in accordance with one or more embodiments of the invention. Assume, like in FIG. 4A, there exists a print manager (410) connected to three print processing resources: multifunction printer (412), cloud print service (414), and print server (416). In FIG. 4B, the print manager (410) receives a print job (450) for an ED specifying output location (418). Moreover, assume that the ED has K pages. The print manager (410) sends a start message with a flag and the ED to the print processing resources (412, 414, 416). In response to receiving the ED and the flag, the print processing resources (412, 414, 416) start rasterizing the ED on a page-by-page basis.

During iteration 1 (455), the cloud print service (414) is the first print processing resource to complete the rasterizing of page 1 and to send the raster image of page 1 back to the print manager (410). Accordingly, the print manager (410) designates the cloud print service (414) as the winning print processing resource, and sends interrupt messages to the losing print processing resources (412, 416). In response to the interrupt message and the flag received earlier, the losing print processing resources (412, 416) each cease their respective rasterizing of page 1, but start rasterizing page 2.

During iteration K−1 (460), the multifunction printer (412) is the first print processing resource to complete the rasterizing of page K−1 and to send the raster image of page K−1 back to the print manager (410). Accordingly, the print manager (410) designates the multifunction printer (412) as the winning print processing resource, and sends interrupt messages to the losing print processing resources (414, 416). In response to the interrupt message and the flag received earlier, the losing print processing resources (414, 416) each cancel their respective rasterizing of page K−1, but start rasterizing page K.

During iteration K (427), the print server (416) is the first print processing resource to complete the rasterizing and to send the raster image of page K back to the print manager (410). Accordingly, the print manager (410) designates the printer server (416) as the winning print processing resource, and sends interrupt messages to the losing print processing resources (412, 414). In response to the interrupt message, the losing print processing resources (412, 414) each cease their respective rasterizing of page K.

Then, the print manager (410) aggregates (i.e., assembles, combines, etc.) the multiple raster images (e.g., raster image of page 1, . . . , raster image of page K−1, raster image of page K−1) of the ED and sends them to the output location (418). The output location (418) may be a printer selected by the user. The output location (418) generates a hardcopy (470) of the ED.

Various embodiments of the invention may have one or more of the following advantages: the ability to distribute an ED to multiple print processing resources and trigger a race among the multiple print processing resources to rasterize ED; the ability to partition the ED into multiple portions, distribute each portion to multiple print processing resources, and trigger a race among the multiple print processing resources to rasterize the portion; the ability to send an interrupt message to cancel rasterizing the ED or portion of the ED after a winning print processing resource is designated; the ability to trigger, using a flag and an interrupt message, losing print processing resources to start rasterizing the next unit of the ED after a winning print processing resource has been selected for the current unit; the ability to distribute a file to multiple processing resources and trigger a race among the multiple processing resource to convert the file to a different format; the ability to distribute variable printing files to multiple print processing resources, etc.

Figure 5:
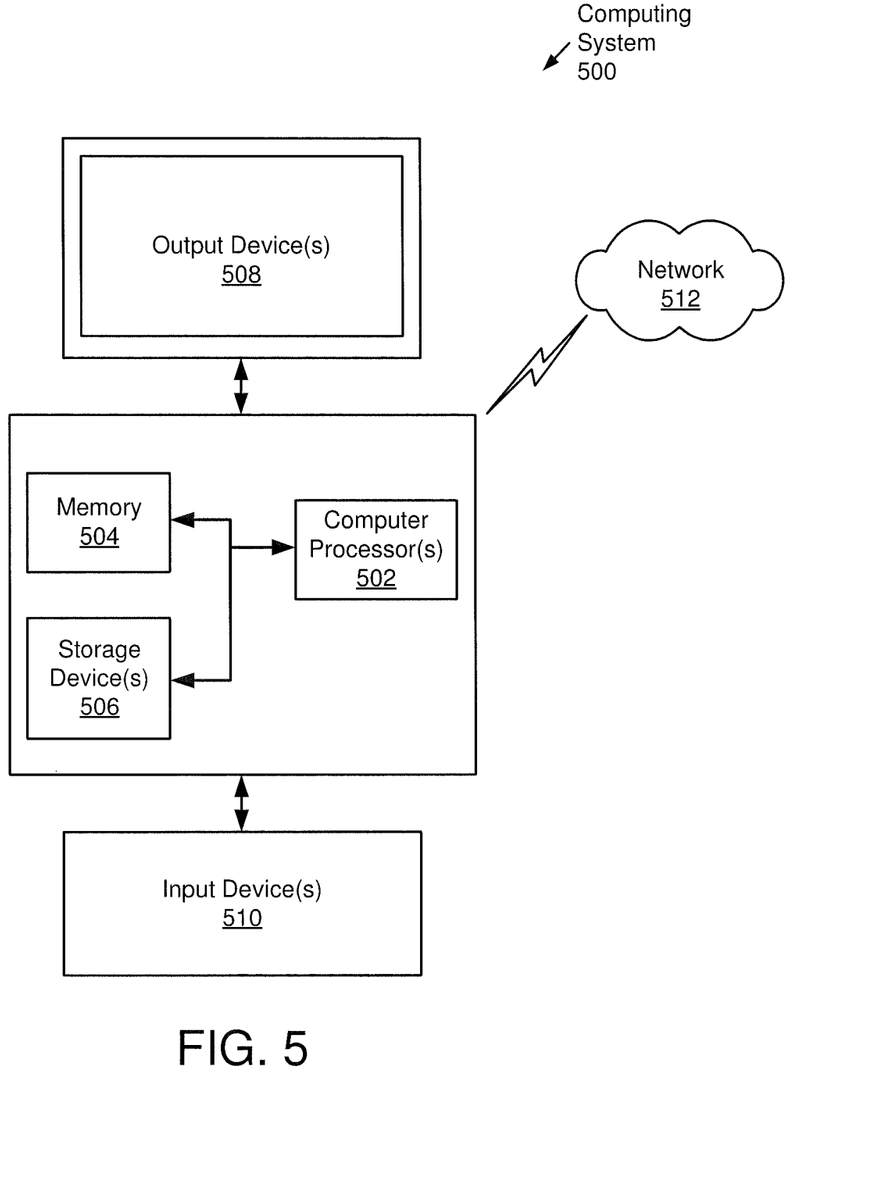
FIG. 5 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of managing an electronic document (ED), comprising:
   receiving, by a print manager, the ED and an output location;
   sending, by the print manager, a first portion of the ED comprising a first page to a plurality of print processing resources (PPRs);
   wherein each of the plurality of PPRs starts independently rasterizing the first page;
   receiving, by the print manager, a first raster image file associated with the first portion from a first winning PPR of the plurality of PPRs;
   sending, by the print manager, an interrupt message to a losing PPR of the plurality of PPRs in response to receiving the first raster image file,
   wherein the losing PPR cancels rasterization of the first portion comprising the first page in response to the interrupt message;
   sending, by the print manager, the first raster image file to the output location;
   sending, by the print manager, a second portion of the ED comprising a second page to the plurality of PPRs after receiving the first raster image file,
   wherein each of the plurality of PPRs starts independently rasterizing the second page; and
   receiving, by the print manager, a second raster image file associated with the second portion,
   wherein the second raster image file is sent, by the print manager, to the output location.

2. The method of claim 1, wherein:
   the output location is a printer connected to the print manager; and
   the printer generates a hardcopy of the ED from the first raster image file and the second raster image file.

3. The method of claim 1, wherein the first winning PPR is a printer.

4. The method of claim 1, wherein the ED is in portable document format (PDF), and wherein the plurality of PPRs comprises at least one selected from a group consisting of a personal computer comprising a print driver, a multifunction printer, and a cloud printing service.

5. The method of claim 1, wherein the second raster image file is generated by a second winning PPR of the plurality of PPRs.

6. A method of managing an electronic document (ED), comprising:
   receiving, by a conversion manager, the ED in a first format and an output location;
   sending, by the conversion manager, a first portion of the ED in the first format to a plurality of conversion processing resources (CPRs);
   receiving, by the conversion manager, the first portion of the ED in a second format from a first winning CPR of the plurality of CPRs;
   sending, by the conversion manager, an interrupt message to a losing CPR of the plurality of CPRs, wherein the losing CPR cancels conversion of the first portion from the first format to the second format in response to the interrupt message;
   sending, by the conversion manager, the first portion in the second format to the output location;
   sending a second portion of the ED in the first format to the plurality of CPRs after receiving the first portion in the second format; and
   receiving the second portion in the second format from a second winning CPR of the plurality of CPRs.

7. A non-transitory computer readable medium (CRM) storing instructions for managing an electronic document (ED), the instructions comprising functionality for:
   receiving the ED and an output location;
   sending a first portion of the ED comprising a first page to a plurality of print processing resources (PPRs),
   wherein each of the plurality of PPRs starts independently rasterizing the first page;
   receiving a first raster image file associated with the first portion from a first winning PPR of the plurality of PPRs;
   sending an interrupt message to a losing PPR of the plurality of PPRs in response to receiving the first raster image file,
   wherein the losing PPR cancels rasterization of the first portion comprising the first page in response to the interrupt message;
   sending the first raster image file to the output location;
   sending a second portion of the ED comprising a second page to the plurality of PPRs after receiving the first raster image file,
   wherein each of the plurality of PPRs starts independently rasterizing the second page; and
   receiving a second raster image file associated with the second portion from a second winning PPR of the plurality of PPRs,
   wherein the second raster image file is sent to the output location.

8. The non-transitory CRM of claim 7, wherein:
   the output location is a printer connected to the print manager; and
   the printer generates a hardcopy of the ED from the first raster image file.

9. The non-transitory CRM of claim 7, wherein the first winning PPR is a printer.

10. A system for managing an electronic document (ED), comprising:
- a plurality of print processing resources (PPRs) comprising at least one selected from a group consisting of a first printer and a cloud printing service;
- a print manager connected to the plurality of PPRs and that:
  - sends a first portion of the ED comprising a first page to the plurality of PPRs,
    wherein each of the plurality of PPRs starts independently rasterizing the first page;
  - receives a first raster image file associated with the first portion from a first winning PPR of the plurality of PPRs;
  - sends an interrupt message to a losing PPR of the plurality of PPRs,
    wherein the losing PPR cancels rasterizing of the first portion comprising the first page in response to the interrupt message;
  - sends a second portion of the ED comprising a second page to the plurality of PPRs after receiving the first raster image file,
    wherein each of the plurality of PPRs starts independently rasterizing the second page; and
  - receives a second raster image the associated with the second portion from a second winning PPR of the plurality of PPRs; and
- a second printer connected to the print manager and that generates a hardcopy of the ED from the first raster image file and the second raster image file.

11. The system of claim 10, wherein the first winning PPR is the first printer.

12. The system of claim 10, wherein the second winning PPR is the cloud printing service.

13. A method of managing an electronic document (ED) comprising a first page and a second page, the method comprising:
- receiving, by a print manager, the ED and an output location;
- sending, by the print manager, the ED and a start message comprising a flag to a plurality of print processing resources (PPRs),
  wherein each of the plurality of PPRs start independently rasterizing the first page of the ED;
- receiving, by the print manager, a first raster image file associated with the first page from a winning PPR of the plurality of PPRs,
  wherein the winning PPR starts independently rasterizing the second page after sending the first raster image file in response to the flag;
- sending, by the print manager, an interrupt message to a losing PPR of the plurality of PPRs,
  wherein the losing PPR cancels rasterization of the first page and starts independently rasterizing the second page of the ED in response to the flag and the interrupt message;
- receiving, by the print manager, a second raster image file associated with the second page; and
- sending, by the print manager, the first raster image file and the second raster image the to the output location.

14. The method of claim 13, wherein the output location is a first printer that generates a hardcopy of the ED, and wherein the winning PPR is a second printer.

* * * * *